US008172021B2

(12) United States Patent
Setoguchi

(10) Patent No.: US 8,172,021 B2
(45) Date of Patent: May 8, 2012

(54) VEHICLE AIR CLEANER MOUNTING STRUCTURE

(75) Inventor: Hirotaka Setoguchi, Shizuoka-ken (JP)

(73) Assignee: Suzuki Motor Corporation, Hamamatsu-Shi, Shizuoka-Ken (JP)

( * ) Notice: Subject to any disclaimer, the term of this patent is extended or adjusted under 35 U.S.C. 154(b) by 269 days.

(21) Appl. No.: 12/589,223

(22) Filed: Oct. 20, 2009

(65) Prior Publication Data

US 2010/0154737 A1 Jun. 24, 2010

(30) Foreign Application Priority Data

Dec. 19, 2008 (JP) ................................ 2008-323197

(51) Int. Cl.
*B60K 13/02* (2006.01)

(52) U.S. Cl. .................................. 180/68.3; 123/198 E

(58) Field of Classification Search ............... 123/198 E; 180/291, 68.3, 68.1; 55/385.3
See application file for complete search history.

(56) References Cited

U.S. PATENT DOCUMENTS 5,062,496 A * 11/1991 Fukada et al. ................ 180/291
5,277,157 A * 1/1994 Teich ........................ 123/198 E
6,096,108 A * 8/2000 Coulonvaux et al. ........ 55/385.3
7,303,042 B2 * 12/2007 Kanehira et al. .............. 180/291
7,361,201 B2 * 4/2008 Nakagome et al. .......... 55/385.3
7,459,004 B2 * 12/2008 Miyake et al. ............... 55/385.3
8,002,863 B2 * 8/2011 Kubo et al. .................. 55/385.3
2007/0079794 A1 * 4/2007 Rotter et al. .............. 123/198 E
2011/0023813 A1 * 2/2011 Pham et al. ............... 123/198 E

FOREIGN PATENT DOCUMENTS

JP 11227474 * 8/1999
JP 2005-171849 A 6/2005
JP 2007001526 * 1/2007

* cited by examiner

*Primary Examiner* — J. Allen Shriver, II
*Assistant Examiner* — Emma K Frick
(74) *Attorney, Agent, or Firm* — Flynn, Thiel, Boutell & Tanis, P.C.

(57) ABSTRACT

A vehicle air cleaner mounting structure is disposed in a space between a shelf portion of a fender apron and a hood. The mounting structure has support portions at at least three points. A protruding portion of the air cleaner protrudes farther inward in a vehicle width direction than a vertical wall of the fender apron. The support portions are disposed outside the protruding portion in the vehicle width direction, the first support portion and the second support portion positioned inside in the vehicle width direction out of the support portions are disposed on a phantom axis line extending in a vehicle front-rear direction in a plan view. The air cleaner is supported to be able to turn about the phantom axis line, and the third support portion is disposed outside the phantom axis line in the vehicle width direction.

7 Claims, 9 Drawing Sheets

VEHICLE AIR CLEANER MOUNTING STRUCTURE

BACKGROUND OF THE INVENTION

1. Field of the Invention

The present invention relates to a mounting structure of an air cleaner, which is disposed in an engine room having an upper face covered with a hood, on a vehicle body.

2. Description of the Related Art

An air cleaner that is an intake member is disposed in an engine room having an upper face covered with a hood and performs a function of cleaning fresh air drawn into an engine.

From a viewpoint of protection of a pedestrian at the time of crash, it is effective to have a long distance between the hood and the air cleaner to obtain a large deformable amount (crash stroke) for the hood.

However, recent vehicle engines are growing in size due to addition of new devices, which reduces a space for mounting the air cleaner in the engine room.

On the other hand, the air cleaner is not a member that can be simply miniaturized because it requires a certain volume for its function.

As a result, if the air cleaner having a necessary capacity for its performance is disposed in an area above a pair of left and right fender aprons or the like in the engine room without enough space above and below in an actual layout, it is impossible to have a sufficient distance between the hood and the air cleaner. Thus the deformation amount of the hood at the time of crash is reduced, shock absorbing performance is degraded, and the pedestrian or the like is not sufficiently protected.

Japanese Patent Application Laid-Open (JP-A) No. 2005-171849 proposes a shock absorbing structure in which an air cleaner (intake member) is formed of an upper half body and a lower half body fitted to each other and the upper half body can be guided by the lower half body and moved downward by a load from above. With this shock absorbing structure, when the hood is deformed downward by a shock of a crash to press the upper half body, the upper half body moves downward to allow deformation of the hood. In this way, it is possible to increase a crash stroke of the hood to thereby enhance a shock absorbing effect, even if it is impossible to have a large space between the hood and the air cleaner.

However, the shock absorbing structure proposed in JP-A No. 2005-171849 employs the structure in which receiving portions that can be fractured are formed at the lower half body of the air cleaner, the receiving portions of the lower half body are fractured by the shock at the time of crash, and the upper half body is moved downward along the lower half body. Therefore, the air cleaner cannot be used again and the structure of the air cleaner is complicated or destroyed.

SUMMARY OF THE INVENTION

The present invention has been made with the above problems in view and it is an object of the invention to provide a vehicle air cleaner mounting structure as a simple structure for effectively absorbing a shock at the time of crash of a vehicle without breaking the air cleaner, even in a layout without enough space between upper and lower portions of the air cleaner and a vehicle body.

To achieve the above object, according to a first aspect of the invention, a vehicle air cleaner mounting structure supports an air cleaner on a vehicle body with support portions at least three points by disposing, in an engine room, a pair of left and right side members extending in a vehicle front-rear direction, providing fender aprons, each of which has a vertical wall extending upward from the side member and a shelf portion extending outward in a vehicle width direction from an upper end of the vertical wall, outside the respective side members in the vehicle width direction to form side walls of the engine room. The air cleaner is disposed in a space formed between the shelf portion of one of the fender aprons and a hood covering an upper portion of the shelf portion. A protruding portion protruding farther inward in the vehicle width direction than the vertical wall of the fender apron is formed on the air cleaner. The support portions are disposed outside the protruding portion in the vehicle width direction, the first support portion and the second support portion positioned inside in the vehicle width direction out of the support portions are disposed on a phantom axis line extending in the vehicle front-rear direction in a plan view. The air cleaner is supported to be able to turn about the phantom axis line of the first support portion and the second support portion, and the third support portion is disposed outside the phantom axis line in the vehicle width direction.

According to a second aspect of the invention, in addition to features of the first aspect of the invention, at least one of the first support portion and the second support portion includes a stick-shaped pin and a support member for supporting the pin in such a manner that the pin can turn.

According to a third aspect of the invention, in addition to features of the first or second aspect of the invention, the third support portion is mounted on the vehicle body in such a manner that it can be inserted and detached in a vertical direction.

With the first aspect of the invention, if downward external force is applied on the protruding portion of the air cleaner via the hood at the time of crash of the vehicle, the air cleaner turns downward or pivots about the phantom axis line connecting the first support portion and the second support portion and moves into a space below the protruding portion. Therefore, even in a layout without enough space between upper and lower portions of the air cleaner and the vehicle body, a crash stroke of the hood is increased, a deformation amount of the hood is increased, and shock or impact absorbing performance of the hood is enhanced and cushions the shock in combination with shock absorption due to the movement of the air cleaner to thereby effectively protect the pedestrian or the like from the shock. In this case, because the air cleaner merely turns about the phantom axis line connecting the first support portion and the second support portion, the air cleaner is not damaged and can be used again and the above effects can be obtained with the simple structure without making structural changes to the air cleaner.

Because the protruding portion protruding farther inward in the vehicle width direction than the vertical wall of the fender apron is formed on the air cleaner, the air cleaner can have a necessary and sufficient capacity with this protruding portion and it is possible to form a space for allowing the air cleaner to turn below the protruding portion.

With the second aspect of the invention, at least one of the first support portion and the second support portion of the air cleaner includes the stick-shaped pin and the support member supporting the pin in such a manner that the pin can turn. Therefore, if downward external force is applied on the protruding portion of the air cleaner at the time of the crash of the vehicle, the air cleaner smoothly and reliably turns about the pin and swiftly moves into the space below the protruding portion to thereby further increase the crash stroke of the hood. The deformation of the hood and the shock absorbing effect obtained by turning of the air cleaner further effectively absorbs the shock and reliably protects the pedestrian or the like from the shock.

With the third aspect of invention, the third support portion of the air cleaner is mounted on the vehicle body in such a manner that it can be inserted and detached in the vertical direction. Therefore, if the downward external force is applied on the protruding portion on the inside in the vehicle width direction of the air cleaner at the time of the crash of the vehicle and, as a result, the air cleaner turns downward about the phantom axis line connecting the first support portion and the second support portion, the third support portion supporting the outer portion in the vehicle width direction of the air cleaner is detached from the vehicle body. As a result, the outer portion in the vehicle width direction of the air cleaner moves upward, turning of the air cleaner about the phantom axis line is not obstructed by the third support portion, the air cleaner can turn smoothly and swiftly, and the large crash stroke of the hood is obtained.

DETAILED DESCRIPTION OF THE INVENTION

Embodiments of the present invention will be described below based on the accompanying drawings.

Figure 1:
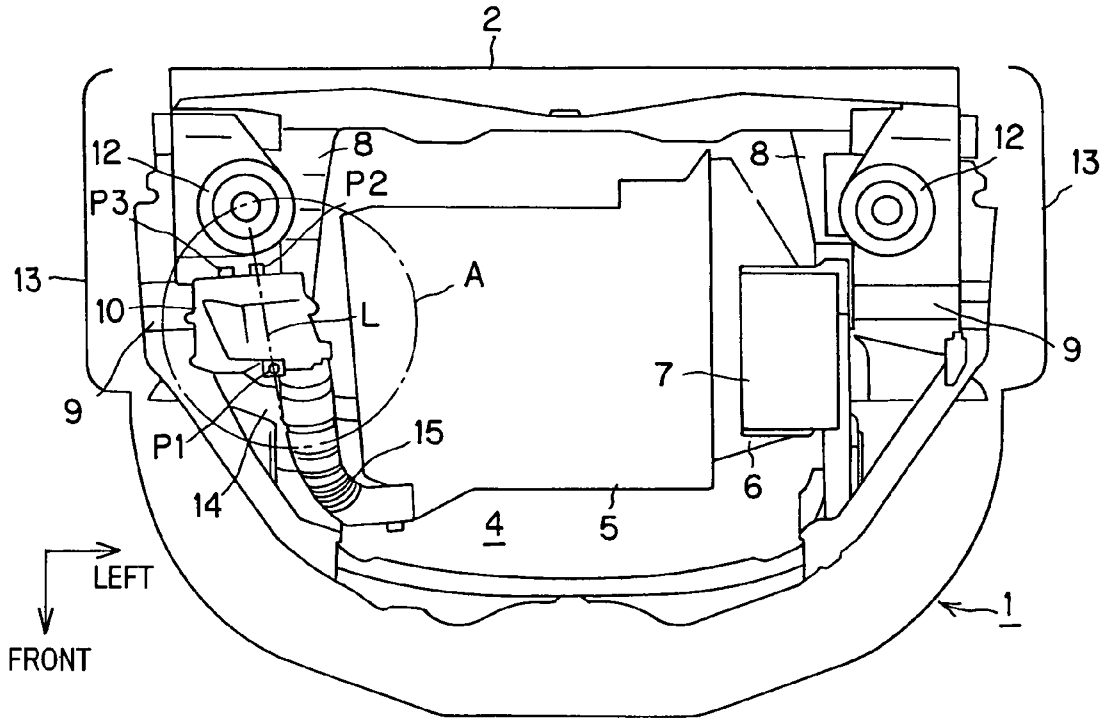
FIG. 1 is a perspective plan view of a vehicle front portion having an air cleaner mounting structure according to the present invention.
Figure 2:
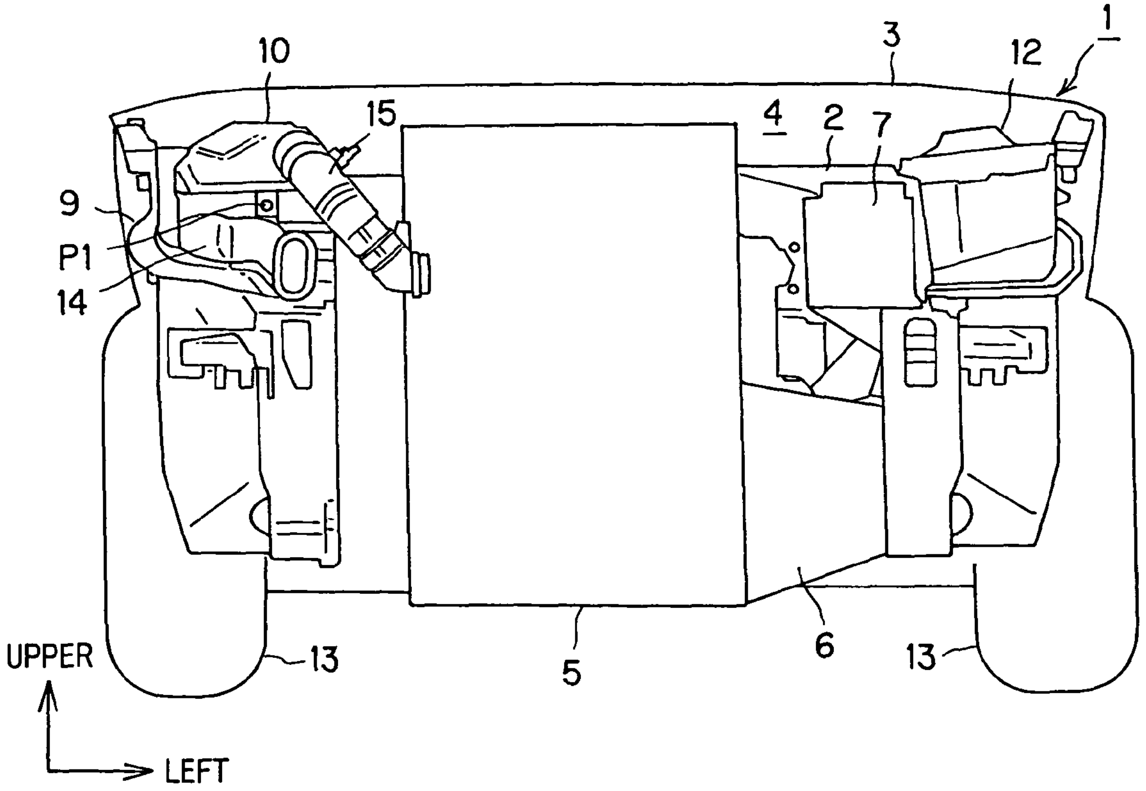
FIG. 2 is a perspective front view of the vehicle front portion having the air cleaner mounting structure according to the invention.

As shown in FIGS. 1 and 2, an engine 5 that is a drive source is mounted on a center in a vehicle width direction of an engine room 4 defined with a dash panel 2 and a hood 3 at a front portion of the vehicle 1. A transmission 6 is mounted to the left of the engine 5, and a battery 7 is disposed above the transmission 6.

Figure 10:
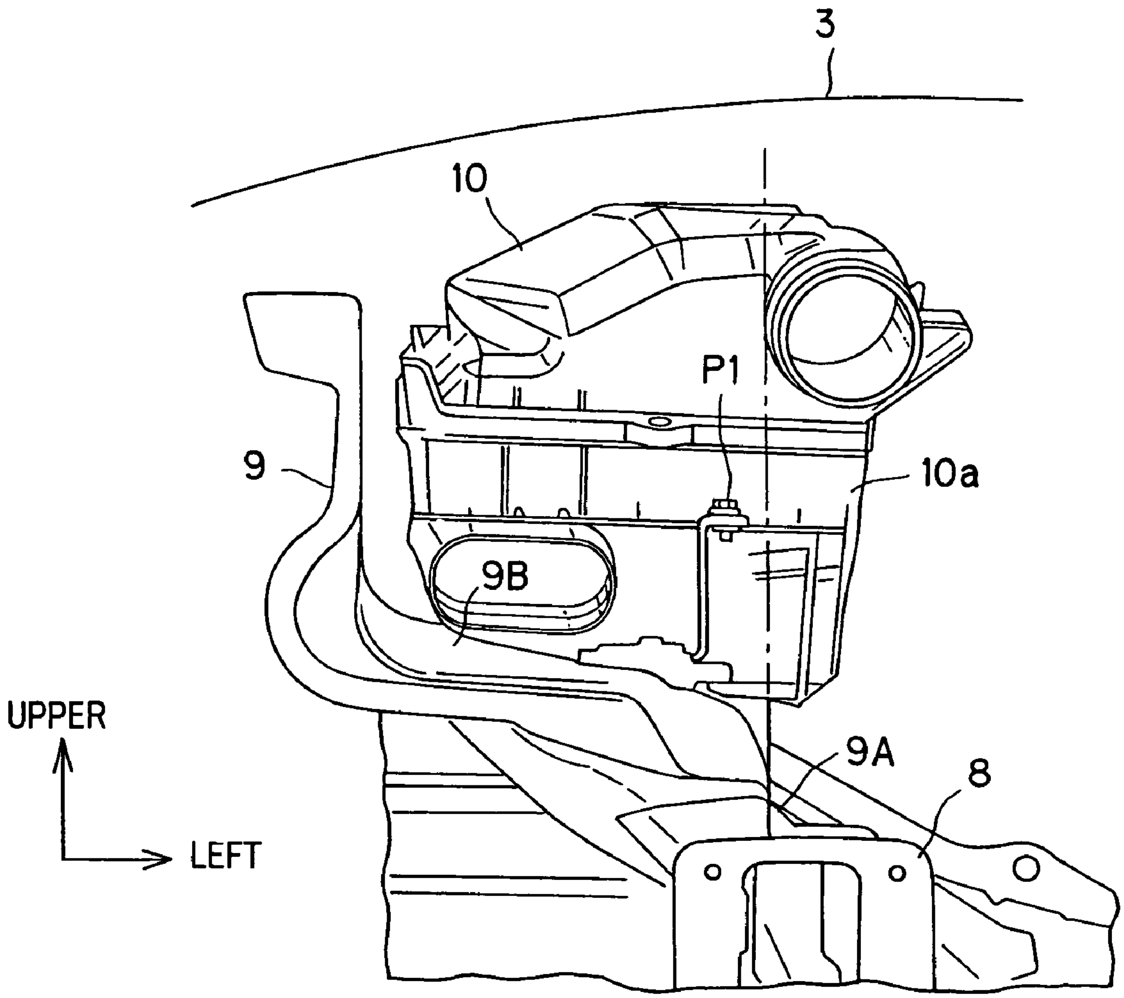
FIG. 10 is a partial front view of the air cleaner before displacement.

A pair of left and right side members 8 extending in a front-rear direction of the vehicle is disposed in the engine room 4 and fender aprons 9 forming side walls of the engine room 4 are provided outside the side members 8, respectively, in the vehicle width direction. Here, as shown in FIG. 10, each of the fender aprons 9 is provided with a vertical wall 9A extending upward from the side member 8 and a shelf portion 9B extending outward in the vehicle width direction from an upper end of the vertical wall 9A (only the right fender apron 9 is shown in FIG. 10). The air cleaner 10 is disposed in a space formed between the shelf portion of the right fender apron 9 and the hood 3 covering the shelf portion from above. In FIGS. 1 and 2, reference numerals 12 represent a pair of left and right strut towers and reference numerals 13 represent a pair of left and right front wheels.

Figure 3:
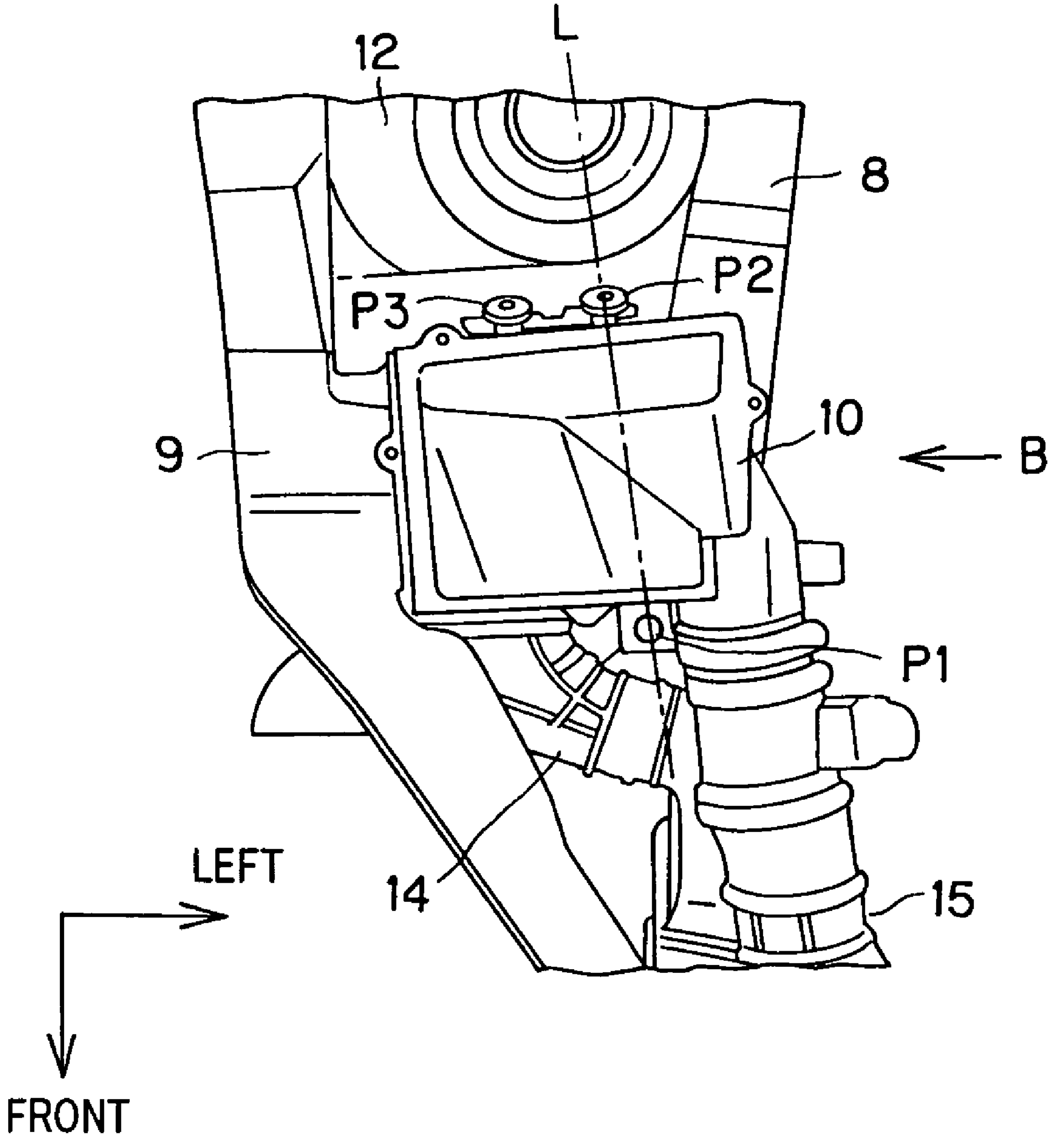
FIG. 3 is an enlarged detailed drawing of portion A taken from FIG. 1.
Figure 4:
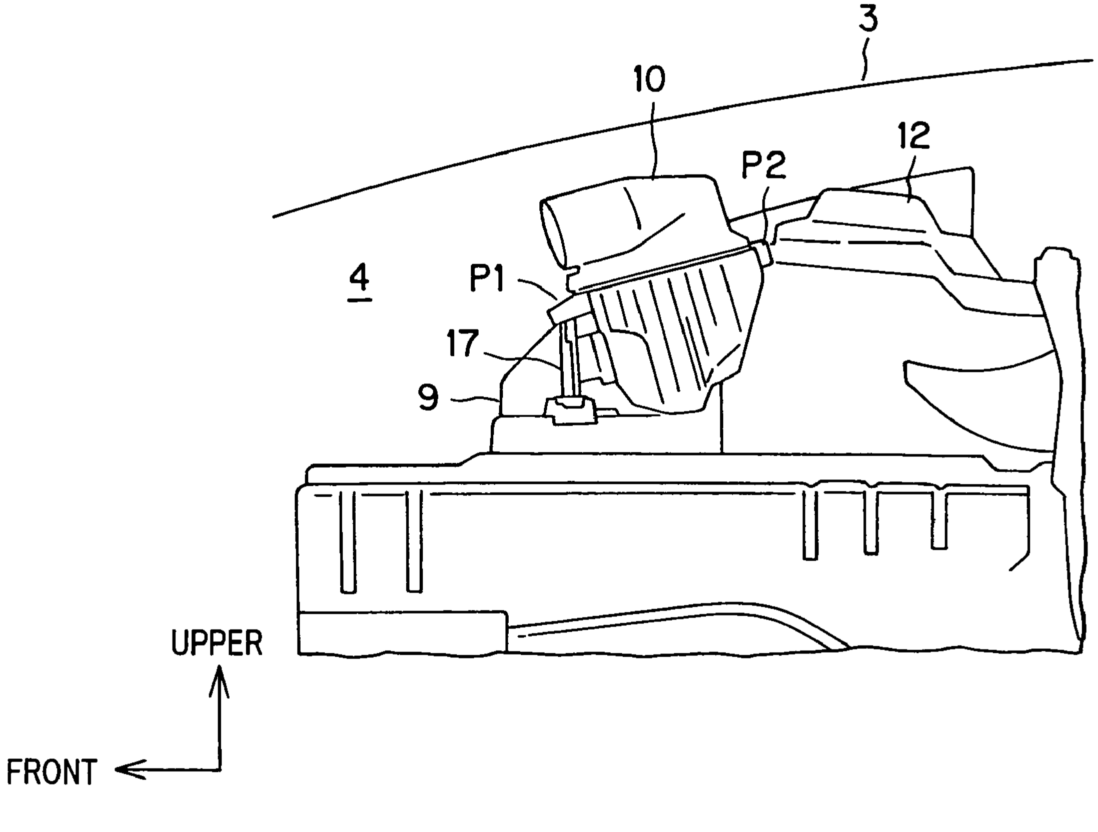
FIG. 4 is a view in a direction of an arrow B in FIG. 3.
Figure 5:
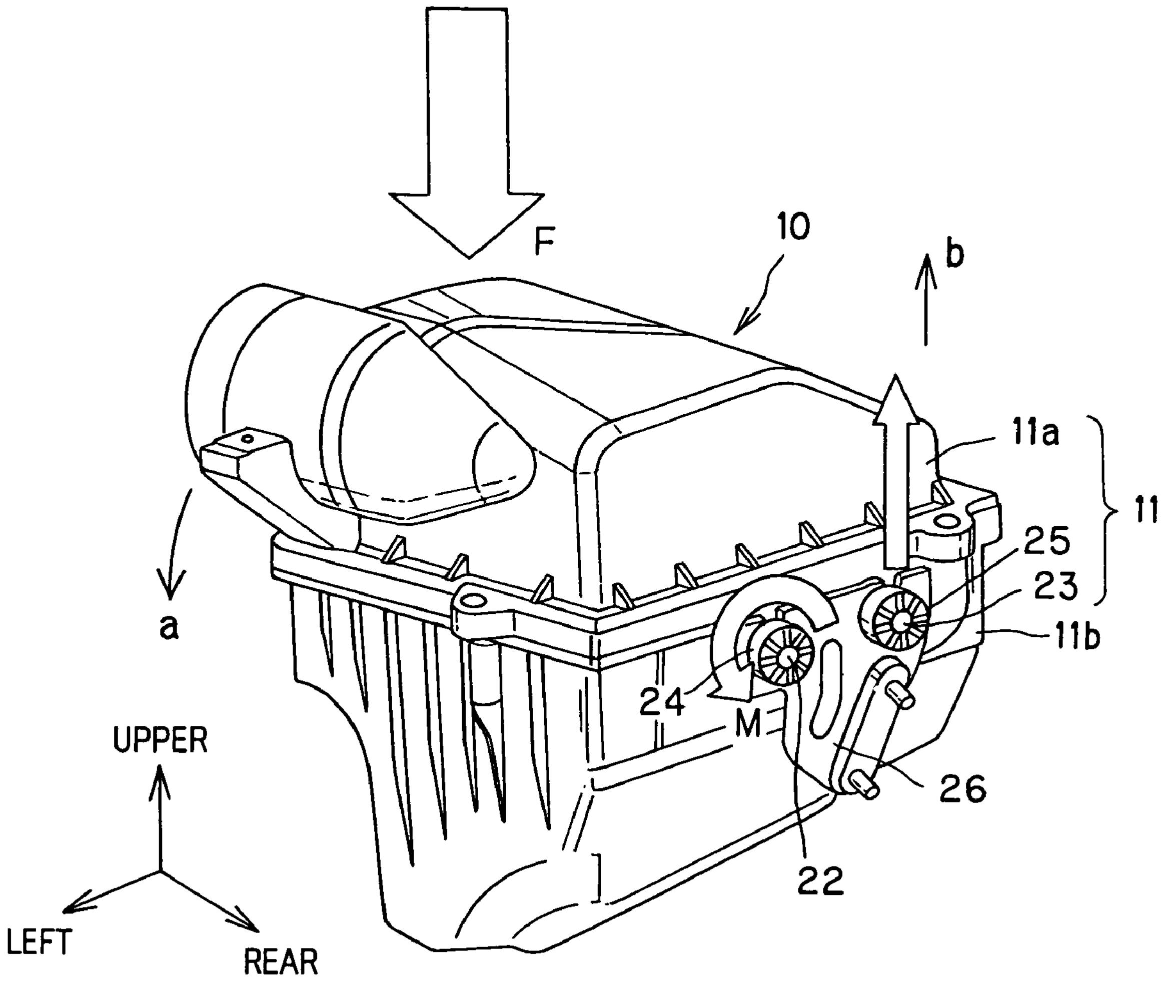
FIG. 5 is a perspective view showing air cleaner support structures (second and third support portions) according to the invention.
Figure 6:
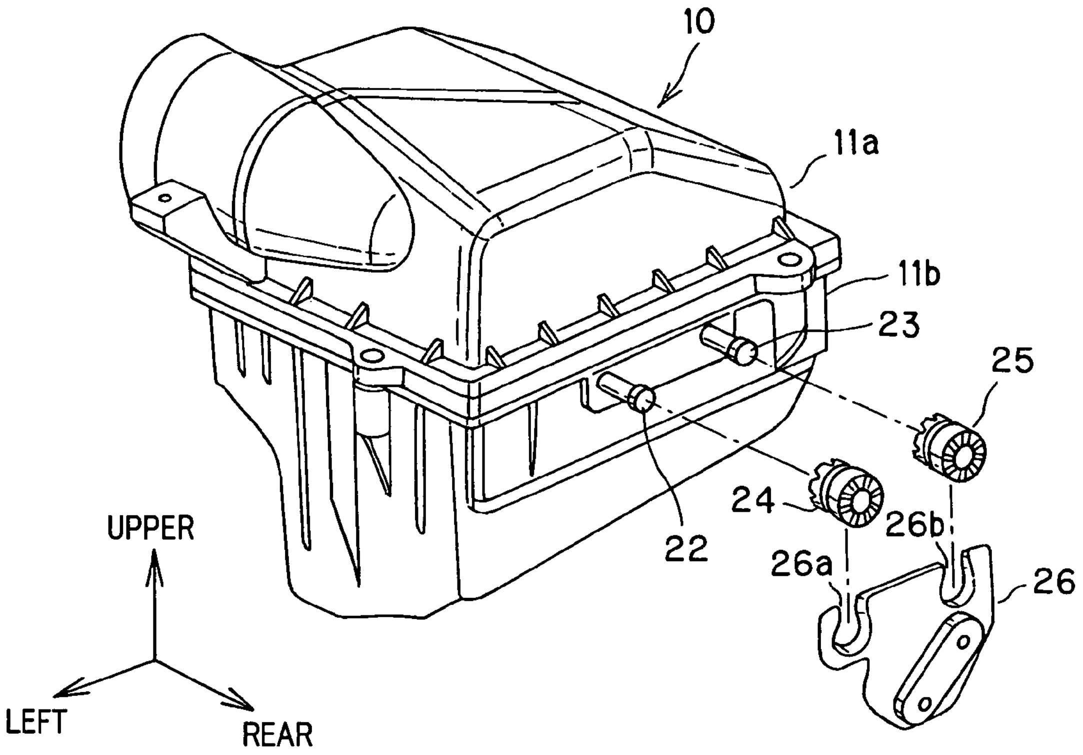
FIG. 6 is an exploded perspective view showing the air cleaner support structures (the second and third support portions) according to the invention.

As shown in FIGS. 5 and 6, the air cleaner 10 includes an air cleaner element (not shown) housed in a rectangular box-shaped air cleaner case 11 formed by bonding an upper half body 11*a* and a lower half body 11*b* made of resin to each other. As shown in FIGS. 1 to 3, an inlet hose 14 is connected to a front face of the lower half body 11*b* forming the air cleaner case 11 and an outlet hose 15 extending forward with respect to the vehicle from a front face of the upper half body 11*a* is bent leftward toward the engine 5 and connected to a right portion of the engine 5.

In the embodiment shown in FIG. 10, the air cleaner 10 has a protruding portion 10*a* protruding farther inward in the vehicle width direction than the vertical wall 9A of the fender apron 9 and the air cleaner 10 is mounted on a vehicle body by a first support portion P1, a second support portion P2, and a third support portion P3 disposed outside the protruding portion 10*a* in the vehicle width direction.

The first support portion P1 supports one point of a front portion of the air cleaner 10, and the second support portion P2 and the third support portion P3 support two points of a rear portion of the air cleaner 10. As shown in FIG. 3, the first support portion P1 and the second support portion P2 positioned inside in the vehicle width direction are disposed on a phantom axis line L extending in the vehicle front-rear direction and the third support portion P3 is disposed outside the phantom axis line L in the vehicle width direction in a plan view. The air cleaner 10 is supported by the first support portion P1 and the second support portion P2 to be able to turn about the phantom axis line L.

Figure 7:
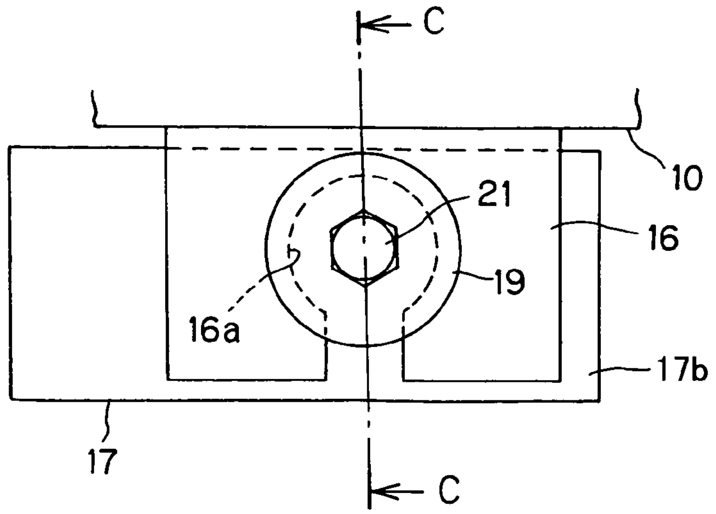
FIG. 7 is a partial plan view showing an air cleaner support structure (a first support portion) according to the invention.
Figure 8:
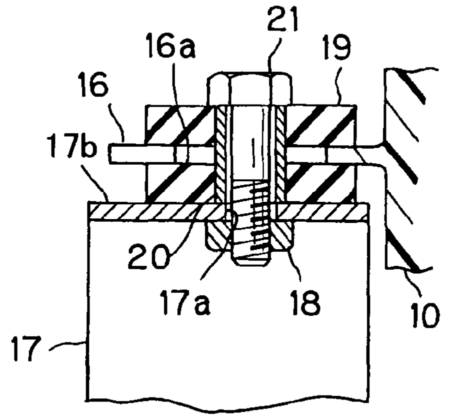
FIG. 8 is a sectional view taken along a line C-C in FIG. 7.
Figure 9:
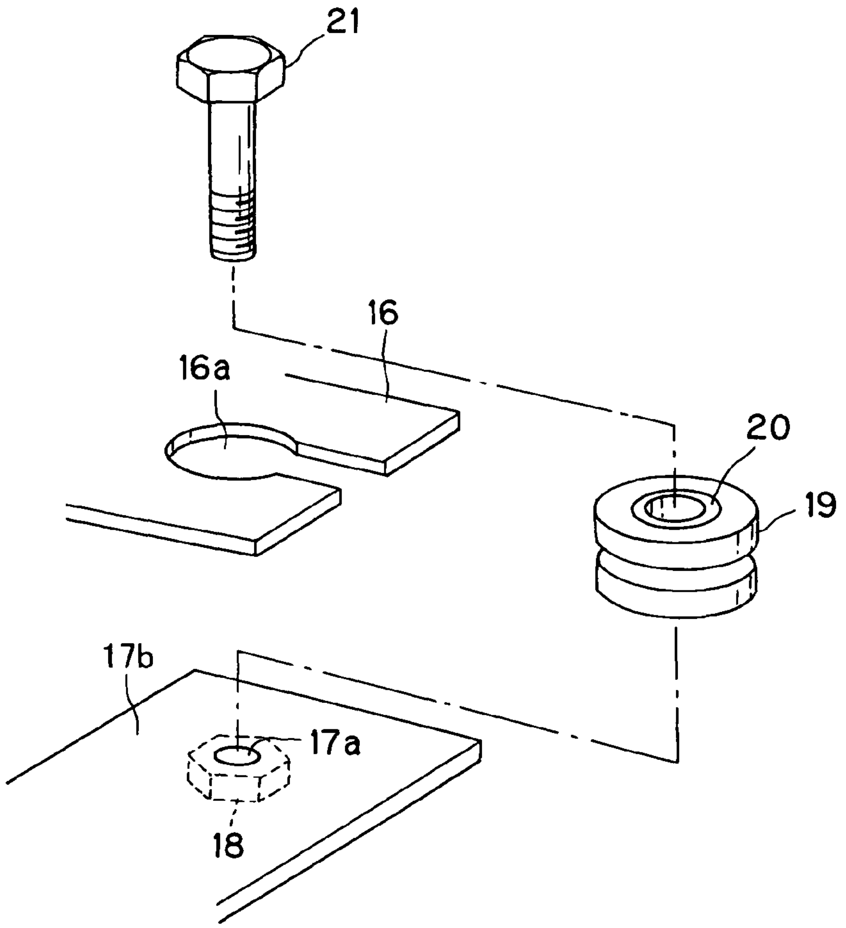
FIG. 9 is an exploded perspective view of the air cleaner support structure (a first support portion) according to the invention.

Here, detail of a structure of the first support portion P1 will be described based on FIGS. 7 to 9.

A rectangular plate-shaped bracket 16 protrudes horizontally from a center in the vehicle width direction of a front face of the air cleaner 10 and a circular notch-shaped engaging hole 16*a* is formed in the bracket 16. A bracket 17 stands on the shelf portion 9B of the fender apron 9. A circular hole 17*a* is formed in a horizontal portion 17*b* at an upper end of the bracket 17, and a nut 18 is welded to a periphery of the circular hole 17*a* on a lower face of the horizontal portion 17*b*.

A columnar mount rubber 19 is engaged in the engaging hole 16*a* in the bracket 16 protruding integrally from the air cleaner 10, the mount rubber 19 is placed on the horizontal portion 17*b* of the bracket 17, a collar 20 inserted through a center of the mount rubber 19 is aligned with the circular hole 17*a* formed in the horizontal portion 17*b* of the bracket 17, and a bolt 21 is inserted from above through the collar 20 of the mount rubber 19 and screwed down into the nut 18. In this way, the front portion of the air cleaner 10 is elastically supported at its first support portion P1 by the bracket 17 with the mount rubber 19 interposed therebetween.

Next, detail of structures of the second support portion P2 and the third support portion P3 will be described based on FIGS. 5 and 6.

As shown in FIG. 6, stick-shaped two pins 22 and 23 protrude horizontally from positions on a rear face of the air cleaner 10 and corresponding to the second support portion P2 and the third support portion P3. Columnar mount rubbers 24 and 25 are fitted and supported over the pins 22 and 23, respectively. A bracket 26 that is a support member is mounted on the right strut tower 12 (see FIGS. 1 and 2) and two circular notch-shaped engaging holes 26*a* and 26*b* that open at their upper portions are formed in the bracket 16 as shown in FIG. 6.

If the mount rubbers 24 and 25 are fitted and supported over the pins 22 and 23 protruding integrally from the rear face of the air cleaner 10 and the respective mount rubbers 24 and 25 are inserted from above into the engaging holes 26*a* and 26*b* of the bracket 26 to be engaged, the rear portion of the air cleaner 10 is elastically supported at its second support portion P2 and third support portion P3 so that it can be inserted and detached in a vertical direction as shown in FIG. 5.

The three points of the air cleaner 10 are elastically supported on the vehicle body by the first support portion P1, the second support portion P2, and the third support portion P3 formed as described above. The air cleaner 10 is supported to be able to turn about the phantom axis line L as a result of elastic deformation of the mount rubber 19 of the first support portion P1 and turning of the pin 22 of the second support portion P2 in the mount rubber 24, the first support portion P1 and the second support portion P2 disposed on the phantom axis line L.

Figure 11:
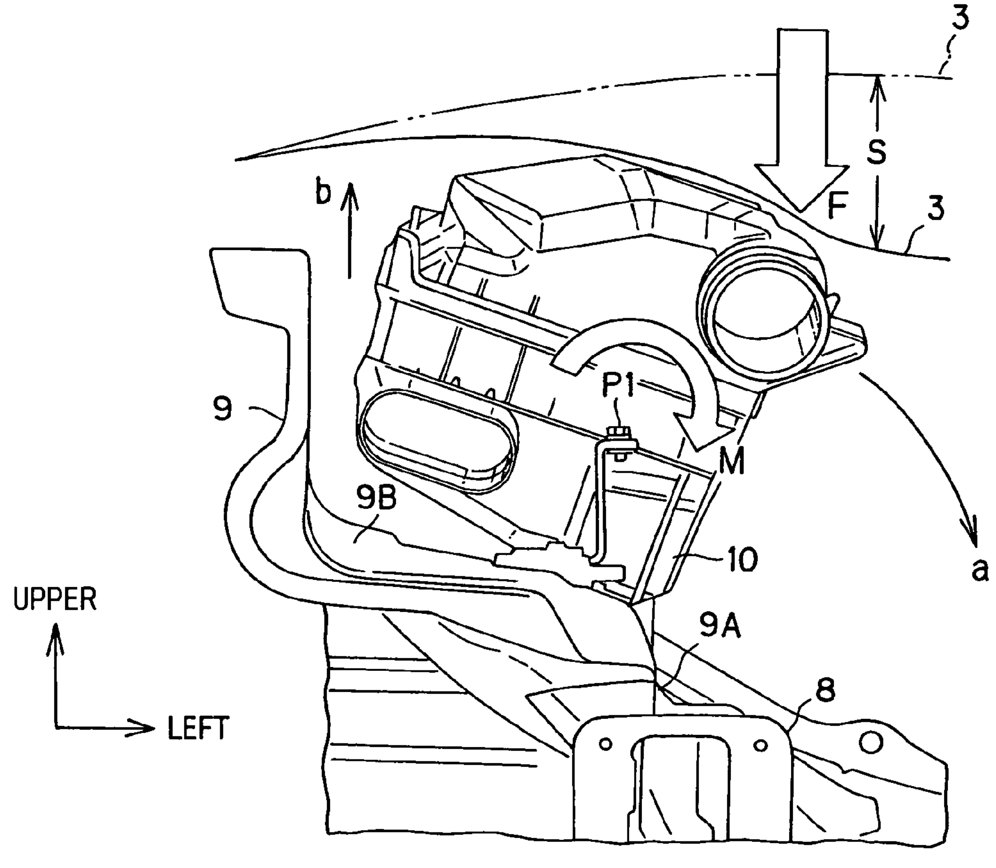
FIG. 11 is a partial front view of the air cleaner after displacement.

In the vehicle 1 in which the air cleaner 10 is mounted on the vehicle body by the above-described mounting structure, if downward external force F is applied on the protruding portion 10*a* of the air cleaner 10 via the hood 3 at the time of crash of the vehicle as shown in FIGS. 5 and 11, moment M about the phantom axis line L connecting the first support portion P1 and the second support portion P2 acts on the air cleaner 10 and therefore the air cleaner 10 turns downward (in a direction of an arrow a in FIGS. 5 and 11) about the phantom axis line L.

As a result, the protruding portion 10*a* of the air cleaner 10 moves into a lower space to allow the hood 3, in a position shown in a chain line in FIG. 11 before the crash, to be deformed massively as shown in a solid line in FIG. 11 by the impact force, which means an increase in the crash stroke S, even in the layout without enough space between the upper and lower portions of the air cleaner 10 and the vehicle body. Consequently, shock absorbing performance of the hood 3 is increased, which, in combination with shock absorption due to the movement of the air cleaner 10, effectively absorbs and cushions the shock and effectively protects the pedestrian or the like from the shock. In this case, the air cleaner 10 only turns about the phantom axis line L connecting the first support portion P1 and the second support portion P2. Therefore, the air cleaner 10 is not damaged and can be used again and the above effects can be obtained with the simple structure without making structural changes to the air cleaner 10.

Because the protruding portion 10*a* protruding farther inward in the vehicle width direction than the vertical wall 9A of the fender apron 9 is formed on the air cleaner 10, the air cleaner 10 can have a necessary and sufficient capacity with this protruding portion 10*a* and it is possible to form a space for allowing the air cleaner 10 to turn below the protruding portion 10*a*.

In one embodiment, the second support portion P2 of the air cleaner 10 includes the stick-shaped pin 22 and the bracket 26 supporting the pin 22 for turning with the mount rubber 24 interposed therebetween. Therefore, if downward external force F is applied on the protruding portion 10*a* of the air cleaner 10 at the time of the crash of the vehicle, the air cleaner 10 smoothly and reliably turns about the pin 22 and swiftly moves into the space below the protruding portion 10*a* to thereby further increase the crash stroke S of the hood 3. The deformation of the hood 3 and the shock absorbing effect obtained by turning of the air cleaner 10 further effectively absorbs the shock and reliably protects the pedestrian or the like from the shock.

In another embodiment, the second support portion P2 and the third support portion P3 supporting the air cleaner 10 can be inserted and detached in the bracket 26 in the vertical direction. Therefore, if the downward external force F is applied on the protruding portion 10*a* on the inside in the vehicle width direction of the air cleaner 10 at the time of the crash of the vehicle 1 and therefore the air cleaner 10 turns downward (in the direction of the arrow a in FIGS. 5 and 11) about the phantom axis line L connecting the first support portion P1 and the second support portion P2, the pin 23 of the third support portion P3 and the mount rubber 25 supporting the outer portion in the vehicle width direction of the air cleaner 10 are detached from the engaging hole 26*b* of the bracket 26 and separated upward (in a direction of an arrow b shown in FIGS. 5 and 11). As a result, the outer portion in the vehicle width direction of the air cleaner 10 moves upward, the third support portion P3 does not obstruct turning of the air cleaner 10 about the phantom axis line L to allow the air cleaner 10 to turn smoothly and swiftly, the large crash stroke S of the hood 3 is obtained, and the large deformation of the hood 3 further effectively absorbs the shock to thereby reliably protect the pedestrian or the like from the shock.

Although the pins 22 and 23 forming the second support portion P2 and the third support portion P3 of the air cleaner 10 protrude from the air cleaner 10 and the engaging holes 26*a* and 26*b* in which the mount rubbers 24 and 25 fitted and supported over the pins 22 and 23 are engaged are formed in the bracket 26, the pins 22 and 23 may protrude from the bracket 26 and the engaging holes 26*a* and 26*b* in which the mount rubbers 24 and 25 fitted and supported over the pins 22 and 23 are engaged may be formed in the air cleaner 10 the other way around. In this case, the circular notch-shaped engaging holes 26*a* and 26*b* need to be open downward.

What is claimed is:

1. A vehicle air cleaner mounting structure for supporting an air cleaner on a shelf portion with support portions at least three points by disposing, in an engine room, a pair of left and right side members extending in a vehicle front-rear direction, providing fender aprons, each of which has a vertical wall extending upward from one of the side members and the shelf portion extending outward away from a center of the engine room in a vehicle width direction from an upper end of the vertical wall, outside the respective side members in the vehicle width direction away from the center of the engine room to form side walls of the engine room, and disposing the air cleaner in a space sandwiched between the shelf portion of one of the fender aprons and a hood covering an upper portion of the shelf portion, wherein a protruding portion protruding farther inwardly in the vehicle width direction towards the center of the engine room than the vertical wall of the fender apron is formed on the air cleaner, the support portions are disposed in the air cleaner outside the protruding portion away from the center of the engine room in the vehicle width direction, a first support portion and a second support portion of the support portions are disposed in a front portion and a rear portion of the air cleaner in the vehicle front-rear direction, respectively, such that an axis line connecting between the first support portion and the second support portion extends in the vehicle front-rear direction, the air cleaner is supported to be able to turn about the axis line by the first support portion and the second support portion, and a third support portion other than the first and second support portions of the support portions is disposed outside of the axis line away from the center of the engine room in the vehicle width direction, and the third support portion is formed to come off from a side of the shelf portion toward an upside of a vehicle when an upward force in an upward direction of the vehicle is exerted on the third support portion; and when an external force in a downward direction of the vehicle is exerted on the protruding portion of the air cleaner through the hood upon crash of the vehicle, the third support portion is allowed to come off from the shelf portion, and the protruding portion of the air cleaner is rotated around the axis line and moved downward relative to the vehicle by the first support portion and the second support portion.

2. The vehicle air cleaner mounting structure according to claim 1, wherein at least one of the first support portion and the second support portion includes a stick-shaped pin having a longitudinal axis thereof extending along the axis line and a support member for supporting the pin so that the air cleaner rotates around the axis line with the pin serving as a pivot point.

3. A vehicle comprising:

an engine room having a pair of left and right side members extending in a vehicle front-rear direction and fender aprons, each fender apron having a vertical wall extending upward from one of the side members and a shelf portion extending outward from an upper end of the vertical wall away from a center of the engine room in a vehicle width direction and outside the side members in the vehicle width direction, with the side members and the fender aprons forming side walls of the engine room; and an air cleaner supported on the shelf portion of one of the fender aprons, the air cleaner having support portions at least three points, the air cleaner being disposed in a space sandwiched between the shelf portion of the one of the fender aprons and a hood covering an upper portion of the shelf portion;

the air cleaner including a protruding portion protruding farther inwardly towards the center of the engine room in the vehicle width direction than the vertical wall of the one of the fender aprons;

the support portions being disposed in the air cleaner outside the protruding portion in a direction away from the center of the engine room in the vehicle width direction;

the support portions comprising a first support portion and a second support portion, the first support portion and the second support portion being disposed in a front portion and a rear portion of the air cleaner in the vehicle front-rear direction, respectively, such that an axis line connecting between the first support portion and the second support portion extends in the vehicle front-rear direction;

the air cleaner being supported to be able to turn about the axis line by the first support portion and the second support portion;

the support portions also including a third support portion, the third support portion being disposed outwardly with respect to the axis line in a direction away from the center of the engine room in the vehicle width direction, the third support portion being formed to come off from a side of the shelf portion toward an upside of the vehicle when an upside force in an upward direction of the vehicle is exerted on the third support portion; and when an external force in a downward direction of the vehicle is exerted on the protruding portion of the air cleaner through the hood upon crash of the vehicle, the third support portion is allowed to come off from the shelf portion, and the air cleaner is rotated around the axis line and the protruding portion is moved downward by the first support portion and the second support portion.

4. The vehicle according to claim 3, wherein:

the air cleaner includes a front side in the vehicle front-rear direction, a rear side in the vehicle front-rear direction, an inner side facing the center of the engine room in the vehicle width direction and an outer side facing away from the center of the engine room in the vehicle width direction;

the first support portion extends from the front side of the air cleaner; and the second support portion extends from the rear side of the air cleaner.

5. The vehicle according to claim 4, wherein:

the air cleaner does not have any support portions extending from the inner side or the outer side thereof, thereby allowing the air cleaner to rotate about the axis line.

6. The vehicle according to claim 4, wherein:

the axis line extends through the air cleaner from the front side to the rear side thereof.

7. The vehicle according to claim 3, wherein:

the first support portion, the second support portion and the third support portion are all connected to the shelf portion of the one of the fender aprons.

* * * * *